US012625658B2

(12) United States Patent
Gormley et al.

(10) Patent No.: US 12,625,658 B2
(45) Date of Patent: May 12, 2026

(54) DYNAMIC PROGRESS BAR

(71) Applicant: The Toronto-Dominion Bank, Toronto (CA)

(72) Inventors: Breena Patricia Gormley, Toronto (CA); Eric Mok, Markham (CA); Jonah Tozman, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 18/790,338

(22) Filed: Jul. 31, 2024

(65) Prior Publication Data

US 2026/0037200 A1 Feb. 5, 2026

(51) Int. Cl.
| | |
|---|---|
| *G09G 5/00* | (2006.01) |
| *G06F 3/14* | (2006.01) |
| *G06T 11/00* | (2006.01) |

(52) U.S. Cl.
CPC .............. *G06F 3/14* (2013.01); *G06T 11/001* (2013.01); *G06T 2200/24* (2013.01)

(58) Field of Classification Search
CPC ...... G06F 3/14; G06T 11/001; G06T 2200/24
USPC ........................................................ 345/156
See application file for complete search history.

(56) References Cited

U.S. PATENT DOCUMENTS

| | | | |
|---|---|---|---|
| 7,290,698 B2 | 11/2007 | Poslinski et al. | |
| 8,122,368 B2 | 2/2012 | Chakra et al. | |
| 8,375,319 B2 * | 2/2013 | Decker ................. | G06F 3/0481 |
| | | | 715/764 |
| 8,793,575 B1 | 7/2014 | Lattyak et al. | |
| 10,016,681 B2 | 7/2018 | Morimura et al. | |
| 10,489,021 B2 * | 11/2019 | Ekstrand ............. | G06F 3/04847 |
| D924,258 S * | 7/2021 | Klimer .......................... | D14/487 |
| D929,417 S * | 8/2021 | Li ................................. | D14/487 |
| 2007/0277122 A1 | 11/2007 | Frijlink et al. | |
| 2008/0256473 A1 | 10/2008 | Chakra et al. | |
| 2008/0307348 A1 | 12/2008 | Jones et al. | |
| 2009/0106684 A1 | 4/2009 | Chakra et al. | |
| 2011/0145745 A1 | 6/2011 | Hyeon et al. | |
| 2012/0044520 A1 * | 2/2012 | Goddard ............... | G06F 3/1207 |
| | | | 358/1.15 |

FOREIGN PATENT DOCUMENTS

CN 104536873 A 4/2015

* cited by examiner

*Primary Examiner* — Jennifer T Nguyen
(74) *Attorney, Agent, or Firm* — Rowand LLP

(57) ABSTRACT

A computer system provides an operation completion indicator that utilizes screen area efficiently. The computer system comprises a processor, a display coupled to the processor, and a memory coupled to the processor. The memory stores instructions that, when executed by the processor, cause the computer system to: display an operation completion indicator indicating progress of the operation, the operation completion indicator containing a plurality of regions, each region: being associated with a respective one of a plurality of upper-level suboperations of the operation, each one of the plurality of upper-level suboperations being in one of an active state or an idle state; detect an active one of the plurality of upper-level suboperations; and divide the associated region of the active upper-level suboperation into at least: a first area representing completed parts of the active upper-level suboperations; and a second area representing incomplete parts of the active upper-level suboperation.

20 Claims, 10 Drawing Sheets

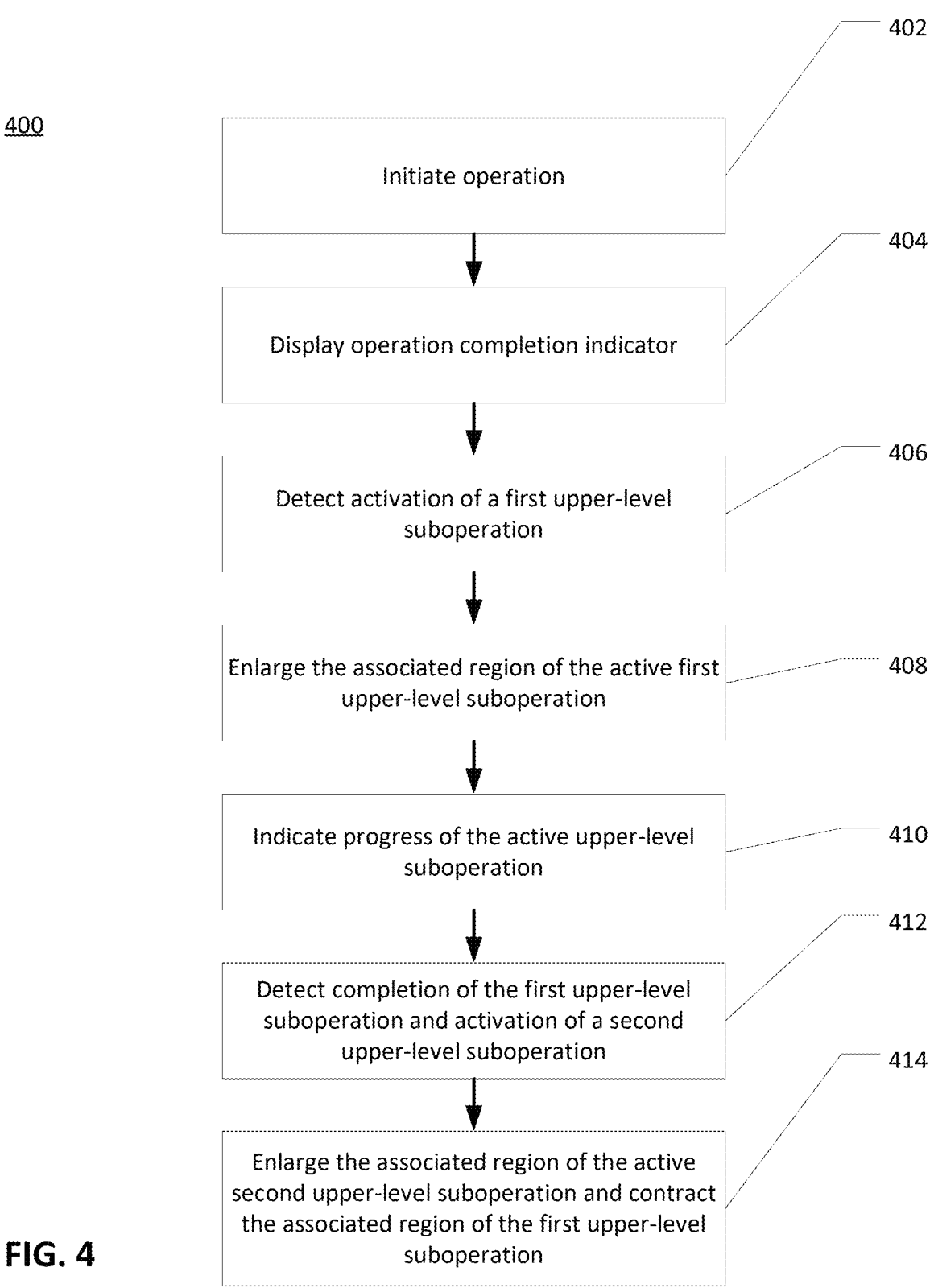

400

402

Initiate operation

404

Display operation completion indicator

406

Detect activation of a first upper-level suboperation

408

Enlarge the associated region of the active first upper-level suboperation

410

Indicate progress of the active upper-level suboperation

412

Detect completion of the first upper-level suboperation and activation of a second upper-level suboperation

414

Enlarge the associated region of the active second upper-level suboperation and contract the associated region of the first upper-level suboperation

FIG. 4

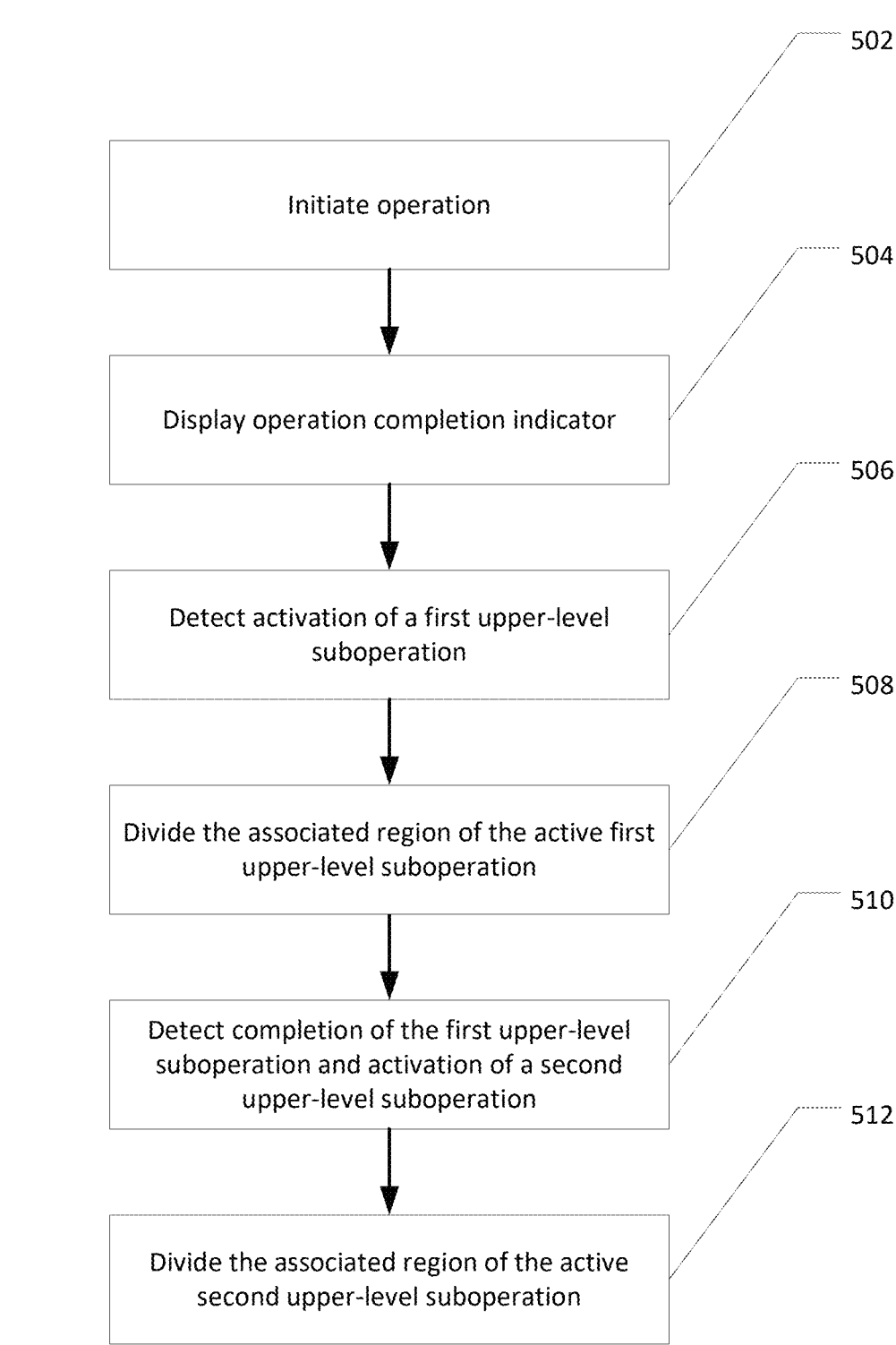

500

502

Initiate operation

504

Display operation completion indicator

506

Detect activation of a first upper-level suboperation

508

Divide the associated region of the active first upper-level suboperation

510

Detect completion of the first upper-level suboperation and activation of a second upper-level suboperation

512

Divide the associated region of the active second upper-level suboperation

Profile    Recommend Purchase

712

714

704 ........

702

700

706

708

710

Profile    Recommend Purchase

712

714

704

711

702

700

706

708

710

Profile    Recommend    Purchase

712

714

704 ........

711

702

700

706

708

710

Profile    Recommend    Purchase

712

714

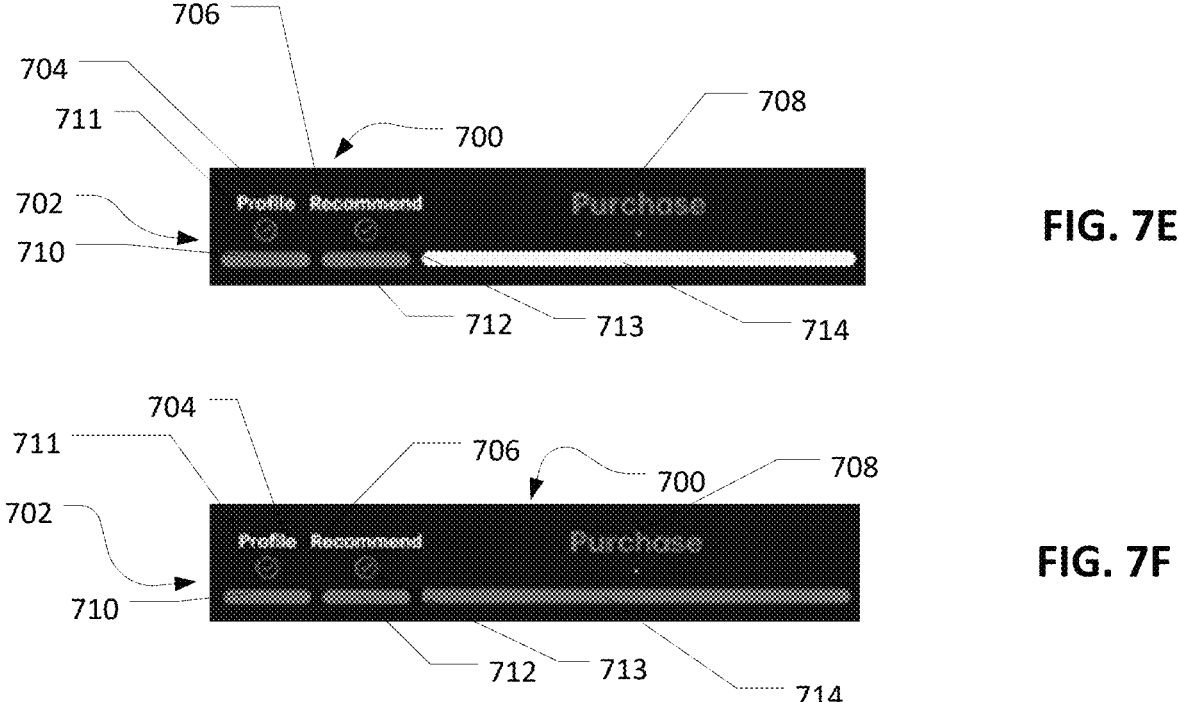
FIG. 7E
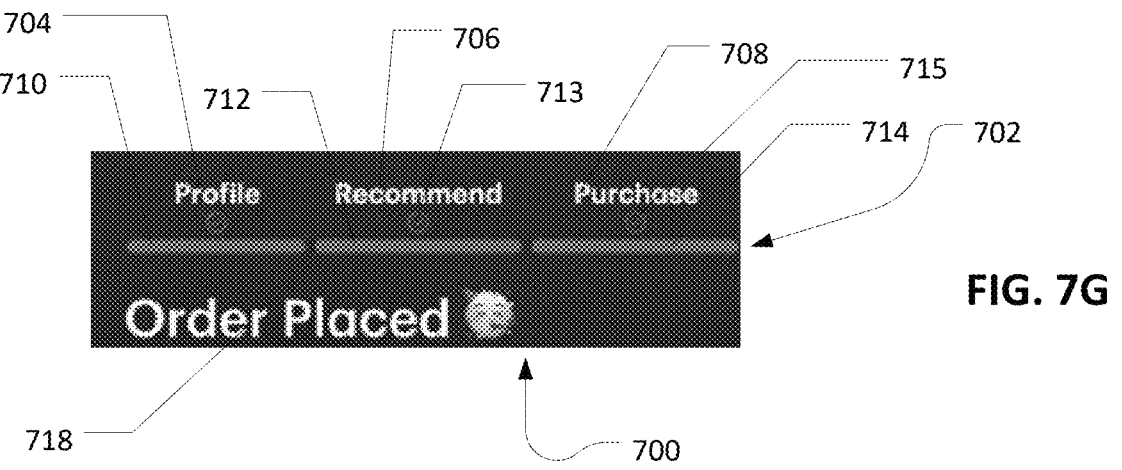
FIG. 7F
FIG. 7G

1000

1010

DYNAMIC PROGRESS BAR

TECHNICAL FIELD

The present application relates to an operation completion indicator, or a progress bar, and, more particularly, to a progress bar that utilizes screen area efficiently.

BACKGROUND

User interfaces may allow efficient data entry, review, and more generally, interaction with computing devices. In particular, user interfaces may be used to convey information, such as the progress of an operation, to a user. Information pertaining to the progress of an operation may include completed suboperations, outstanding suboperations, and pending suboperations.

Some computing devices have limited display space. Other computing devices have ample display space, but the requirements of particular application domains may necessitate maximizing the use of that display space. It may be desirable to compactly present data to a user. However, providing various user interfaces using conventional operation completion indicators may consume unacceptably large portions of the display space or lose information conveyed.

BRIEF DESCRIPTION OF THE DRAWINGS

Embodiments are described in detail below, with reference to the following drawings:

FIG. 4 depicts, in flowchart form, example steps performed by an application providing a user interface displaying an operation completion indicator;

FIG. 5 depicts, in flowchart form, example steps performed by another embodiment of an application providing a user interface displaying an operation completion indicator;

FIGS. 7A-7G illustrate an example application scenario for an application providing a user interface displaying an operation completion indicator;

Like reference numerals are used in the drawings to denote like elements and features.

DETAILED DESCRIPTION OF VARIOUS EMBODIMENTS

Figure 1:
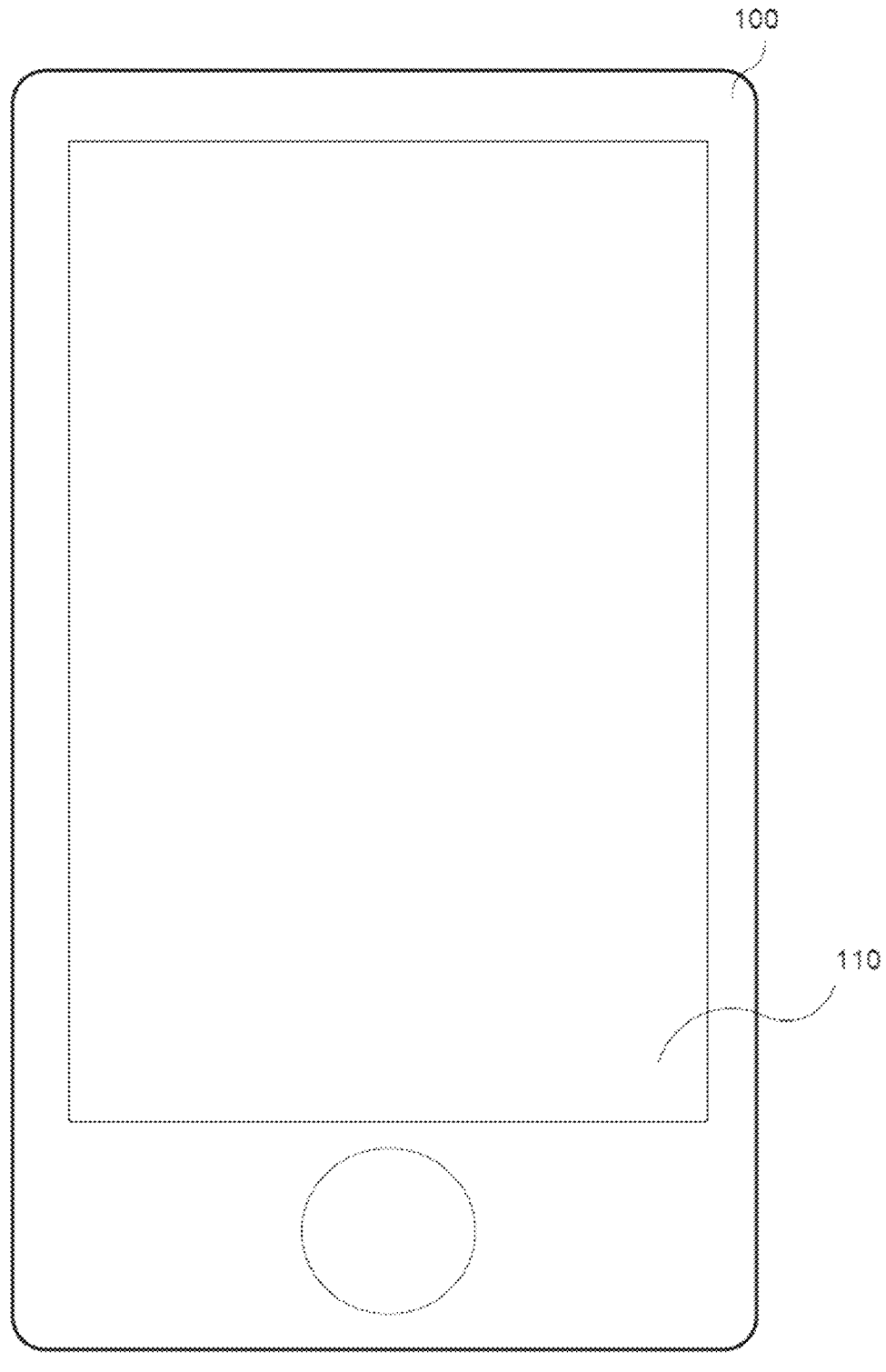
FIG. 1 illustrates an example computing device.

In an aspect, there is described a computer system for displaying progress of an operation. The computer system includes a processor and a display coupled to the processor. The computer system includes a memory coupled to the processor. The memory stores instructions that, when executed by the processor, cause the computer system to: display an operation completion indicator indicating progress of the operation, the operation completion indicator containing a plurality of regions, each region: being associated with a respective one of a plurality of upper-level suboperations of the operation, each one of the plurality of upper-level suboperations being in one of an active state and an idle state; indicating, when its associated upper-level suboperation is in the idle state, whether the associated upper-level suboperation is complete; detect an active one of the plurality of upper-level suboperations. The instructions further causing the processor to: divide, in response to detecting the active one of the plurality of upper-level suboperations, the associated region of the active one of the plurality of upper-level suboperations into at least: a first area representing completed parts of the active one of the plurality of upper-level suboperations; and a second area representing incomplete parts of the active one of the plurality of upper-level suboperations.

In some implementations, the plurality of upper-level suboperations may include at most one upper-level suboperation in the active state.

In some implementations, the plurality of upper-level suboperations may be executed in an order and detecting completion of a first active upper-level suboperation may cause the first active upper-level suboperation to enter the idle state and a second upper-level suboperation to enter the active state. Thee second upper-level suboperation may be the upper-level suboperation to be executed after the first upper-level suboperation.

In some implementations, at least one of the plurality of upper-level suboperations progresses in response to input received via an input device.

In some implementations, displaying the operation completion indicator indicating progress of the operation may include indicating that one of the plurality of upper-level suboperations is in the active state by displaying the region associated with the one of the plurality of upper-level suboperations to be enlarged relative to the regions associated with each of the upper-level suboperations in the idle state.

In some implementations, displaying the operation completion indicator indicating progress of the operation may include indicating that one of the plurality of upper-level suboperations is in the active state by: displaying the region associated with the one of the plurality of upper-level suboperations in a first color; and displaying another region of the plurality of regions in a second color. The another region may be associated with an upper-level suboperation in the idle state.

In some implementations, displaying the operation completion indicator indicating progress of the operation may include indicating that one of the plurality of upper-level suboperations is complete by: displaying the region associated with the one of the plurality of upper-level suboperations in a first color; and displaying another region of the plurality of regions in a second color. The another region may be associated with another one of the plurality upper-level suboperations, the another one being in the idle state and not complete.

In some implementations, one of the regions associated with one of the upper-level suboperations in the active state contains a plurality of subregions, each subregion: being associated with a respective one of a plurality of lower-level suboperations of the one of the upper-level suboperations; and indicating whether the associated lower-level suboperation is complete.

In some implementations, at least one of the plurality of lower-level suboperations progresses in response to input received via a input device.

In some implementations, the operation completion indicator may remain displayed in a fixed location on the display throughout the progress of the operation.

In another aspect, the present application described a computer-implemented method for displaying progress of an operation. The computer-implemented method may include: displaying an operation completion indicator indicating progress of the operation, the operation completion indicator containing a plurality of regions, each region: being associated with a respective one of a plurality of upper-level suboperations of the operation, each one of the plurality of upper-level suboperations being in one of an active state and an idle state; indicating, when its associated upper-level suboperation is in the idle state, whether the associated upper-level suboperation is complete; detecting an active one of the plurality of upper-level suboperations; and dividing, in response to detecting the active one of the plurality of upper-level suboperations, the associated region of the active one of the plurality of upper-level suboperations into at least: a first area representing completed parts of the active one of the plurality of upper-level suboperations; and a second area representing incomplete parts of the active one of the plurality of upper-level suboperations.

In some implementations, the plurality of upper-level suboperations includes at most one upper-level operation in the active state.

In some implementations, the plurality of upper-level suboperations are executed in an order and detecting the completion of a first active upper-level suboperation causes the first active upper-level suboperation to enter the idle state and a second upper-level suboperation to enter the active state, the second upper-level suboperation being the upper-level suboperation to be executed after the first upper-level suboperation.

In some implementations, at least one of the plurality of upper-level suboperations progresses in response to input received via an input device.

In some implementations, displaying the operation completion indicator indicating progress of the operation includes indicating that one of the plurality of upper-level suboperations is in the active state by displaying the region associated with the one of the plurality of upper-level suboperations to be enlarged relative to the regions associated with each of the upper-level suboperations in the idle state.

In some implementations, displaying the operation completion indicator indicating progress of the operation includes indicating that one of the plurality of upper-level suboperations is in the active state by: displaying the region associated with the one of the plurality of upper-level suboperations in a first color; and displaying another region of the plurality of regions in a second color. The another region may be associated with an upper-level suboperation in the idle state.

In some implementations, displaying an operation completion indicator indicating progress of the operation includes indicating that one of the plurality of upper-level suboperations is complete by: displaying the region associated with the one of the plurality of upper-level suboperations in a first color; and displaying another region of the plurality of regions in a second color. The another region may be associated with another one of the plurality upper-level suboperations, the another one being in the idle state and not complete.

In some implementations, one of the regions associated with one of the upper-level suboperations in the active state contains a plurality of subregions, each subregion: being associated with a respective one of a plurality of lower-level suboperations of the one of the upper-level suboperations; and indicating whether the associated lower-level suboperation is complete.

In some implementations, the operation completion indicator remains displayed in a fixed location on the display throughout the progress of the operation.

In another aspect, a non-transitory computer-readable storage medium is described. The computer-readable storage medium includes computer-executable instructions which, when executed, configure a processor to perform a method described herein. For example, in an aspect the instructions cause the processor to: display an operation completion indicator indicating progress of an operation, the operation completion indicator containing a plurality of regions, each region: being associated with a respective one of a plurality of upper-level suboperations of the operation, each one of the plurality of upper-level suboperations being in one of an active state and an idle state; indicating, when its associated upper-level suboperation is in the idle state, whether the associated upper-level suboperation is complete; detect an active one of the plurality of upper-level suboperations; and divide, in response to detecting the active one of the plurality of upper-level suboperations, the associated region of the active one of the plurality of upper-level suboperations into at least: a first area representing completed parts of the active one of the plurality of upper-level suboperations; and a second area representing incomplete parts of the active one of the plurality of upper-level suboperations.

In another aspect, a computer system for displaying progress of an operation is described. The computer system may include a processor. The computer system may include a memory coupled to the processor, storing instructions that, when executed by the processor, cause the computer system to: display an operation completion indicator indicating progress of the operation, the operation completion indicator containing a plurality of regions, each region associated with a respective one of a plurality of upper-level suboperations of the operation; determine a number of lower-level suboperations associated with a first one of the plurality of upper-level suboperations; and configure the region associated with the first one of the plurality of upper-level suboperations to display a plurality of sub-regions corresponding to the number of lower-level suboperations associated with the first one of the plurality of upper-level suboperations only when the first one of the plurality of upper-level suboperations is the active one of the plurality of upper-level suboperations.

In another aspect, a method is described. The method may include: displaying an operation completion indicator indicating progress of the operation, the operation completion indicator containing a plurality of regions, each region associated with a respective one of a plurality of upper-level suboperations of the operation; determining a number of lower-level suboperations associated with a first one of the plurality of upper-level suboperations; and configuring the region associated with the first one of the plurality of upper-level suboperations to display a plurality of sub-regions corresponding to the number of lower-level suboperations associated with the first one of the plurality of upper-level suboperations only when the first one of the plurality of upper-level suboperations is the active one of the plurality of upper-level suboperations.

In another aspect, a non-transitory computer-readable storage medium is described. The computer-readable storage medium includes computer-executable instructions which, when executed, configure a processor to: display an operation completion indicator indicating progress of the operation, the operation completion indicator containing a plurality of regions, each region associated with a respective one of a plurality of upper-level suboperations of the operation; determine a number of lower-level suboperations associated with a first one of the plurality of upper-level suboperations; and configure the region associated with the first one of the plurality of upper-level suboperations to display a plurality of sub-regions corresponding to the number of lower-level suboperations associated with the first one of the plurality of upper-level suboperations only when the first one of the plurality of upper-level suboperations is the active one of the plurality of upper-level suboperations.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 illustrates an electronic device 100, exemplary of embodiments.

The electronic device 100 is a computing device. The electronic device 100 is equipped with a display 110.

In some embodiments, the electronic device 100 may be a portable electronic device. For example, the electronic device 100 may, as illustrated, be a smartphone. However, the electronic device 100 may be a computing device of another type such as a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays), and any other type of computing device that may be configured to store data and software instructions, and execute software instructions to perform operations consistent with disclosed embodiments. The electronic device 100 may be associated with one or more users which may interact with the electronic device 100. For instance, a user may operate the electronic device 100 such as by way of a provided user interface whereby the electronic device may perform one or more operations consistent with the disclosed embodiments.

The electronic device 100 includes a display 110. As discussed above, the electronic device 100 may provide a user interface and the display 110 may display the user interface. The display 110 may be any suitable manner of display such as, for example, a liquid crystal display (LCD), an e-ink/e-paper display, or the like. In some embodiments, the display 110 may be a touchscreen display.

The electronic device 100 may include application software that provides the aforementioned user interface. As further exemplified below, the use of user interfaces may be employed in a variety of applications. Further, as known to skilled person, user interfaces may also be provided by a systems software such as, for example, as an interface to operating systems.

Figure 2:
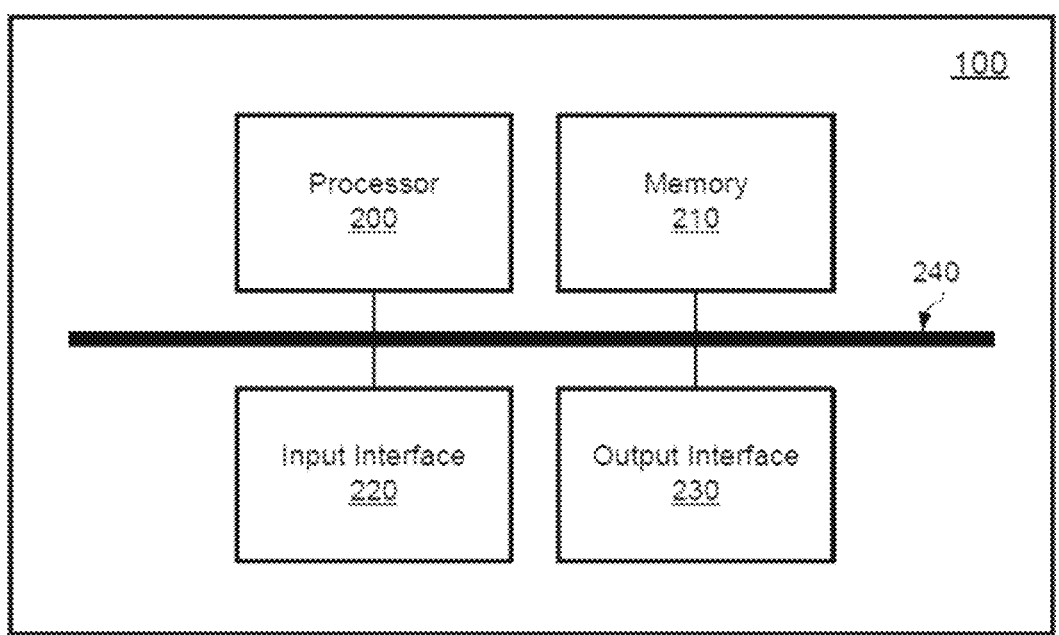
FIG. 2 is a high-level operation diagram of an example computing device.

FIG. 2 is a high-level operation diagram of the electronic device 100. As will be discussed in greater detail below, the electronic device 100 includes software that adapts it to perform a particular function.

The electronic device 100 includes a variety of modules. For example, as illustrated, the electronic device 100 may include a processor 200, a memory 210, an input interface 220, and an output interface 230. As illustrated, the foregoing example modules of the electronic device 100 are in communication over a bus 240.

The processor 200 is a hardware processor. The processor 200 may, for example, be one or more ARM, Intel x86, PowerPC processors or the like.

The memory 210 allows data to be stored and retrieved. The memory 210 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the electronic device 100.

The input interface 220 allows the electronic device 100 to receive input signals. signals may, for example, correspond to input received from a user. The input interface 220 may serve to interconnect the electronic device 100 with one or more input devices. Input signals may be received from input devices by the input interface 220. Input devices may, for example, include one or more of a touchscreen input, keyboard, trackball or the like. For example, where the display 110 is a touchscreen, input interface 220 may allow the electronic device 100 to receive and/or may process touch input signals therefrom. In some embodiments, all or a portion of the input interface 220 may be integrated with an input device. For example, the input interface 220 may be integrated with one of the aforementioned example input devices.

The output interface 230 allows the electronic device 100 to provide output signals. Some output signals may, for example allow provision of output to a user. The output interface 230 may serve to interconnect the electronic device 100 with one or more output devices. Output signals may be sent to output devices by output interface 230. Output devices may include, for example the display 110. Additionally or alternatively, output devices may include devices other than screens such as, for example, a speaker, indicator lamps such as for, example, light-emitting diodes (LEDs), and printers. In some embodiments, all or a portion of the output interface 230 may be integrated with an output device. For example, the output interface 230 may be integrated with one of the aforementioned example output devices.

Software comprising instructions is executed by the processor 200 from a computer-readable medium. For example, software may be loaded into random-access memory from persistent storage of the memory 210. Additionally or alternatively, instructions may be executed by the processor 200 directly from read-only memory of the memory 210.

Figure 3:
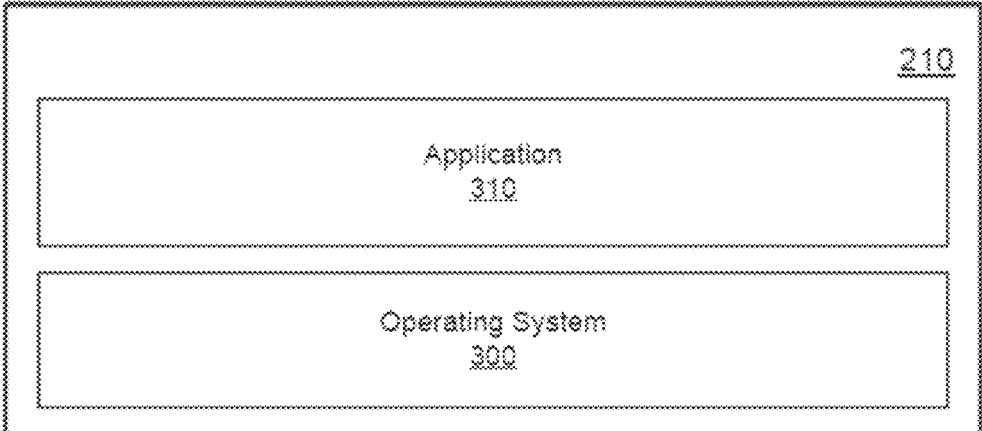
FIG. 3 depicts a simplified software organization exemplary of the example computing device of FIG. 2.

FIG. 3 depicts a simplified organization of software components stored in the memory 210 of the electronic device 100. As illustrated these software components include an operating system 300 and an application 310.

The operating system 300 is software. The operating system 300 allows the application 310 to access the processor 200, the memory 210, the input interface 220, and the output interface 230. The operating system 300 may be, for example, Google™ Android™, Apple IOS™, Microsoft™ Windows™, or the like.

The application 310 adapts the electronic device 100, in combination with the operating system 300, to operate as a device to a particular function. As a part of this, user interfaces may be provided. For example, one or more user interfaces may be displayed on the display 110.

In some applications, provision may be made for communicating the completion or progress of an operation. For example, a user interface may be provided displaying an operation completion indicator, or a progress bar.

In some embodiments, the operation may require user input and the operation completion indicator may communicate data input progress to the user.

In some embodiments, display space for providing a user interface that includes an operation completion indicator may be limited. For example, the display itself may be limited in size. Additionally or alternatively, the space available within the display for providing such a user interface may be limited such as for example, due to the size of a display window or the portion of the display available to the application. In these and other scenarios, the display area consumed by standard operation completion indicators may be prohibitively large or lacking in information conveyed to the user.

The following describes an operation completion indicator that, when employed in a user interface displayed on an electronic device by way of software executed by the electronic device, may overcome one or more of the limitations of conventional operation completion indicators or combinations thereof.

The operation of the electronic device 100 in providing a user interface including the operation completion indicator is described with reference to the flowchart of FIG. 4. FIG. 4 illustrates a method 400 that includes steps 402 and onward. A computer-readable medium may store instructions for performing the method 400. Steps 402 and onward may be performed by one or more processors of a computing device, such as for example the processor 200 of the electronic device 100, executing software such as, for example, a suitable instance of the application 310. The software may include instructions which cause the method 400 to be performed.

At the step 402, the processor initiates an operation. In some embodiments, the operation may comprise receiving data input from a user. For example, the operation may be or include an input operation. By way of example, the operation may involve a form.

Figure 10:
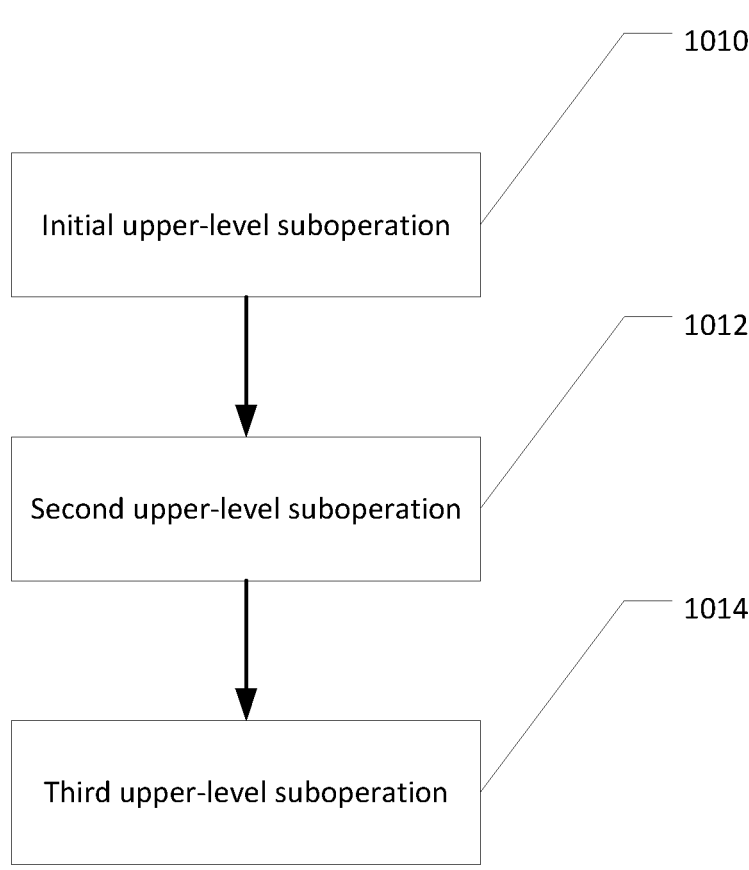
FIG. 10 illustrates an example operation for which progress is indicated by an operation completion indicator.

Referring briefly to FIG. 10, an example operation for which progress is indicated by an operation completion indicator is illustrated. For example, FIG. 10 illustrates an operation 1000 that may be initiated at the step 402.

The operation 1000 may include a first upper-level suboperation 1010, a second upper-level suboperation 1012, and a third upper-level suboperation 1014 (collectively, the upper-level suboperations 1010, 1012, and 1014). In some embodiments, one or more of the upper-level suboperations 1010, 1012, 1014 may include receiving data input from a user. In other embodiments, upper-level suboperations 1010, 1012, and 1014 may not involve receiving any data input from a user. In some embodiments, there may be more than three upper-level suboperations. In other embodiments, there may be less than three upper-level suboperations.

In operation 1000, the upper-level suboperations 1010, 1012, and 1014 are executed in sequence respectively. In other embodiments, some upper-level suboperations or an operation may be executed concurrently with other upper-level suboperations.

Each of the upper-level suboperations 1010, 1012, and 1014 may be considered, at a given time, to be in one of an active state or an idle state. An active state may be a state during execution. For example, the first upper-level suboperation 1010 is in the active state during its execution, the second upper-level suboperation 1012 is in the active state during its execution, and the third upper-level suboperation 1014 is in the active during its execution. An idle state may be a state of a suboperation when the suboperation is not being executed. In some implementations, the idle state may be a state of a suboperation prior to or after execution of that suboperation. For example, the first upper-level suboperation 1010 is in the idle state prior to its execution or upon completion, the second upper-level suboperation 1012 is in the idle state prior to its execution or upon completion, and the third upper-level suboperation 1014 is in the idle state prior to execution or upon completion.

In some embodiments, completion of an active upper-level suboperation causes that upper-level suboperation to enter the idle state and the subsequent upper-level suboperation to enter the active state. For example, in the operation 1000, completion of a first upper-level suboperation 1010 causes the first upper-level suboperation 1010 to enter the idle state and the second upper-level suboperation 1012 to enter the active state. Similarly, completion of Returning to FIG. 4, following the step 402, flow control proceeds to a step 404.

At the step 404, the processor causes to be displayed an operation completion indicator for the operation initiated at step 402, for example the operation 1000.

FIGS. 7A-7G illustrate an example application that includes instances of an operation completion display area 700 including the operation completion indicator 702.

The operation completion indicator 702 is divided into a first region 710, a second region 712, and a third region 714 (collectively, the regions 710, 712, and 714). The regions 710, 712, and 714 are each associated with an upper-level suboperation. The upper-level suboperations associated with the regions 710, 712, and 714 may be a first upper-level suboperation 1010, a second upper-level suboperation 1012, and a third upper-level suboperation 1014 respectively. In some embodiments, the operation completion display area 700 may provide labels 704, 706, and 708 for each of the regions 710, 712, and 714 and their associated upper-level suboperations. For example, in FIG. 7A, the first upper-level suboperation 1010, associated with the first region 710, is labelled "Profile," the second upper-level suboperation 1012, associated with region 712, is labelled "Recommend," and the third upper-level suboperation 1014, associated with region 714, is labelled "Purchase."

The color and size of regions 710, 712, and 714 may be used to indicate whether their associated upper-level suboperation is in the active state or the idle state. Additionally or alternatively, the color and size of regions 710, 712, and 714 may be used to indicate whether or not their associated upper-level suboperations have been completed. For example, a first color may indicate that no part of an upper-level suboperation has been completed. Additionally or alternatively, a second color may indicate that an upper-level suboperation is partially completed. Optionally, a third color may indicate that an upper-level suboperation is completed.

In the example operation completion display area 700, an operation completion indicator 702, and/or each of regions 710, 712, and 714, and/or each of labels 704, 706, and 708 may be displayed at the step 402.

Returning to FIG. 4, following the step 404, flow control proceeds to a step 406.

At the step 406, the processor detects activation of a first upper-level suboperation. For example, the first upper-level suboperation 1010 may be detected to be in the active state. Activation of a first upper-level suboperation may be detected by detecting that an interface associated with the first upper-level suboperation is active. That is, the processor may detect activation of the first upper-level suboperation when it determines that an interface associated with that suboperation is displayed on a device. In some implementations, the interface may be an electronic form or other input interface.

Following the step 406, flow control proceeds to a step 408.

At the step 408, the associated region of the detected active first upper-level suboperation is enlarged. The step 408 may be performed automatically in response to detecting that the first upper-level suboperation is active.

Figures 7A, 7B, 7C, 7D:
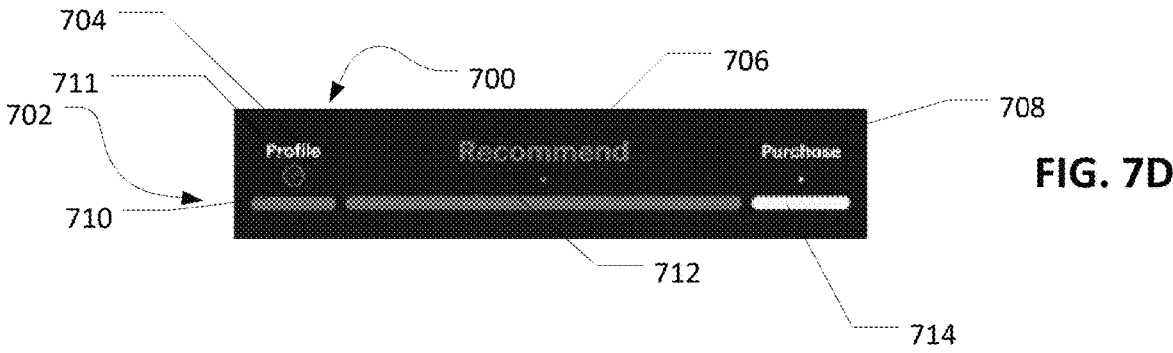

For example, referring briefly to FIG. 7A, an example operation completion display area 700 is illustrated. The operation completion display area 700 may be displayed at the step 408. This example may be appropriate for a state in which no part of the upper-level suboperations 1010, 1012, and 1014 have been completed. The first region 710, associated with the first upper-level suboperation 1010, is enlarged relative to the regions 712 and 714, thereby indicating that the first upper-level suboperation 1010 is active. In FIG. 7A, the regions 710, 712, and 714 are all depicted in a common colour, which may be referred to as a first color. This may indicate that no part of the upper-level suboperations 1010, 1012, and 1014 have been completed.

In other embodiments, the first region 710 may be automatically enlarged without detecting that the first upper-level suboperation 1010 is in the active state.

In some embodiments, an upper-level suboperation may require user input for that suboperation to be considered to be completed. For example, the first upper-level suboperation 1010 may correspond to suboperation of collecting input data, such as user profile information from a user of an application. FIG. 7A may correspond to a scenario where the user has not yet input any profile information and therefore the first region 710 is of the first color indicating that no part of the first upper-level suboperation 1010 has been completed. Despite having no completed parts, the first upper-level suboperation 1010 may still be in the active state and waiting to receive input from the user.

Returning to FIG. 4, following the step 408, flow control proceeds to a step 410.

At the step 410, the operation completion indicator indicates progress of the active upper-level suboperation. The method 400 may include operations of detecting such progress and the operation completion indicator may be updated in response to detecting such progress.

For example, in FIG. 7B, which illustrates partial completion of a first upper-level suboperation, the first region 710 is of a second color indicating that the first upper-level suboperation 1010 has at least been partially completed but not fully completed. In FIG. 7B, the regions 712 and 714 remain the first color, thereby indicating that no part of the upper-level suboperations 1012 and 1014 have been completed.

In some embodiments, an upper-level suboperation may require user input to be completed. FIG. 7B may correspond to a scenario where the user has input at least some input data, such as some profile information, and therefore the first region 710 is of the second color indicating that at least part of the first upper-level suboperation 1010 has been completed.

In some embodiments where an upper-level suboperation requires user input to proceed, the user may be required to input data on separate pages. In some such implementations, each page may correspond to a separate upper-level suboperation. The operation completion indicator or operation completion display area may appear to remain in the same fixed location on the user interface, irrespective of which of the upper-level suboperations is active. That is, the operation completion indicator may remain at the same location even as other contents of the displayed interface change. For example, the first upper-level suboperation may require a user to input a username on a first page and an address on a second page. FIG. 7A may illustrate the appearance of the operation completion display area 700 when the user has not yet input the username or the address. FIG. 7B may illustrate the appearance of the operation completion display area 700 when the user has input the username, but has not yet moved to the second page, and therefore has not input the address. FIG. 7B may also illustrate the appearance of the operation completion display area 700 when the user has input the username on the first page and the address on the second page.

Returning to FIG. 4, following the step 410, flow control proceeds to a step 412.

At the step 412, the processor detects completion of the first upper-level suboperation and activation of a second upper-level suboperation. For example, the first upper-level suboperation 1010 may be detected to have been completed and to be in the idle state. Furthermore, the second upper-level suboperation 1012 may be detected to be in the active state.

In some embodiments, a user clicking a "next" or a "submit" button may cause the completion of the first upper-level suboperation and the activation of the second upper-level suboperation. For example, in a state where the first upper-level suboperation 1010 corresponds to collecting profile information from a user of an application, the first upper-level suboperation may be completed upon the user clicking "submit" subsequent to inputting all required profile information. The act of clicking "submit" may trigger the first upper-level suboperation 1010 to enter the idle state and the second upper-level suboperation 1012 to enter the active state. Other transitionary triggers may also be performed instead of or in addition to the submit button. For example, in some implementations, the interface may allow for swipe gestures to input a indicator that a currently displayed page has been completed.

Turning to FIG. 7C, a first completion mark 711 may be displayed in the operation completion display area to indicate that the first upper-level suboperation 1010, associated with the first region 710, has been completed. In some embodiments, the first completion mark 711 may be a checkmark.

Returning to FIG. 4, following the step 412, flow control proceeds to a step 414.

At the step 414, the processor enlarges the associated region of the second upper-level suboperation and contracts the associated region of the first upper-level suboperation. Step 414 may be performed by the processor automatically in response to detection of completion of the first upper-level suboperation and/or in response to detecting of activation of the second upper-level suboperation.

Referring now to FIG. 7C, an example operation completion display area 700 is illustrated. This example illustrates a state where a first upper-level suboperation is completed and in the idle state and a second upper-level suboperation is in the active state, the first region 710 is contracted relative to the same in FIG. 7B. Also, in FIG. 7C, the second region 712 is enlarged relative to the same in FIG. 7B. In FIG. 7C, the second region 712 is also enlarged relative to the first region 710.

A similar step to the step 410 may be repeated for the second upper-level operation. For example, FIG. 7D illustrates a state of an operation completion display area 700 when the second upper-level suboperation is at least partially completed. In this example, the second region 712 may be of the second color.

More generally, similar steps to the steps 410, 412, and 414 may be repeated according to the number of upper-level suboperations of the operation for which progress is being conveyed by the operation completion indicator.

For example, in FIG. 7E, a second completion mark 713 may be displayed in the operation completion display area to indicate that the second upper-level suboperation 1012 has been completed. Further, in FIG. 7E, the second region 712 is contracted relative to the same in FIG. 7D, thereby indicating that its associated upper-level suboperation, the second upper-level suboperation 1012, has been completed and is in the idle state. Further, in FIG. 7E, the third region 714 is enlarged relative to the same in FIG. 7D, thereby indicating that its associated upper-level suboperation, the third upper-level suboperation 1014, is in the active state. Also, in FIG. 7E, the third region 714 is enlarged relative to the second region 712. Further, in FIG. 7F, the third region 714 is of the second color, thereby indicating that its associated upper-level suboperation, the third upper-level suboperation 1014, is at least partially complete.

Upon completion of all upper-level suboperations of an operation, the operation completion display area may indicate that the operation is complete.

For example, FIG. 7G illustrates an example operation completion display area 700 in a state where the operation 1000 has completed. In this example, the regions 710, 712, and 714 are equally sized, thereby indicating that the associated upper-level suboperations 1010, 1012, and 1014 are in the idle state. Further, the regions 710, 712, and 714 are of the second color, thereby indicating that the associated upper-level suboperations 1010, 1012, and 1014 are partially complete. Further, the first completion mark 711, the second completion mark 713, and a third completion mark 715 are displayed in the operation completion display area 700, thereby indicating that the upper-level suboperations 1010, 1012, and 1014 are complete.

A message may also be displayed in the operation completion display area to convey that the operation has completed.

For example, in FIG. 7G, a message 718 expressing the words "Order Placed" and an emoji is displayed in the operation completion display area 700.

The various regions of the operation completion display areas described herein may be selectable for navigation purposes. Put differently, the various regions which are associated with the various suboperations may be selectable to re-activate a different suboperation. For example, an input selector (such as a mouse pointer or a finger or stylus on a touchscreen display) may be used to select a particular suboperation by activating the region associated with that suboperation on the operation completion display area. This may cause a current suboperation to be placed in an idle state and the selected suboperation to be placed in an active state. When this occurs, an interface associated with the selected suboperation may be displayed in place of the interface associated with the suboperation that was placed in the idle state.

Reference is made to FIG. 5, which depicts, in flowchart form, example steps performed by another embodiment of an application providing a user interface displaying an operation completion indicator. The example steps may be referred to as method 500. FIG. 5 illustrates a method 500 that includes steps 502 and onward. A computer-readable medium may store instructions for performing the method 500. Steps 502 and onward may be performed by one or more processors of a computing device, such as for example the processor 200 of the electronic device 100, executing software such as, for example, a suitable instance of the application 310. The software may include instructions which cause the method 500 to be performed.

At a step 502, the processor initiates an operation. In some embodiments, the operation may include receiving data input from a user. The step 502 is similar to the step 402 in FIG. 4. The operation initiated at the step 502 may be the operation 1000 in FIG. 10.

At a step 504, similar to the step 404 in FIG. 4, the processor causes to be displayed an operation completion indicator for the operation initiated at step 502, for example the operation 1000.

Figures 8, 9A, 9B:
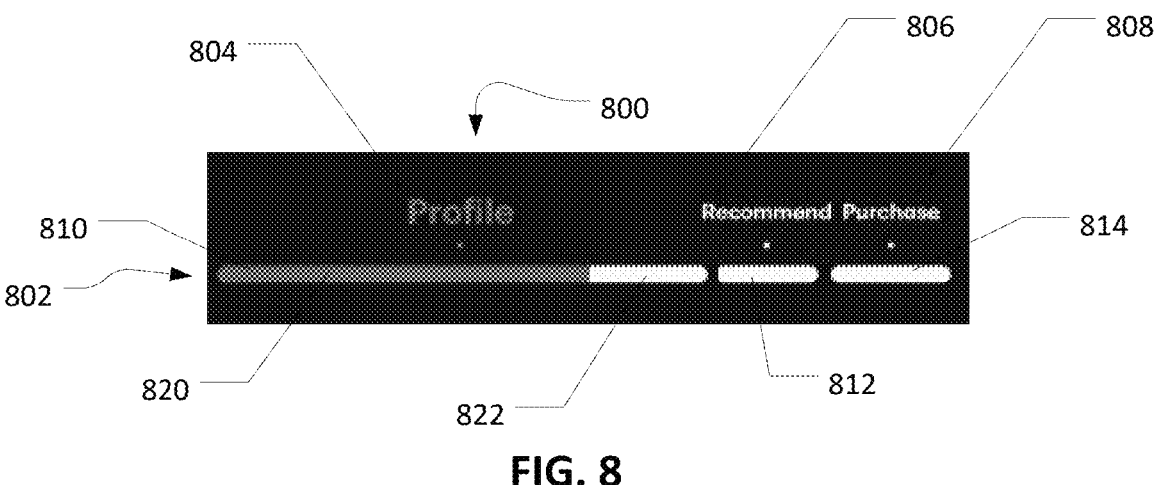
FIG. 8 illustrates another example application scenario for an application providing a user interface displaying an operation completion indicator.
FIGS. 9A and 9B illustrate another example application scenario for an application providing a user interface displaying an operation completion indicator.

Referring now to FIG. 8, an example operation completion display area 800 is illustrated. The operation completion display area 800 may be displayed during the method 500. The operation completion display area 800 and an operation completion indicator 802 may be displayed at the step 504. The operation completion indicator 802 includes a first region 810 associated with a first upper-level suboperation, a second region 812 associated with a second upper-level suboperation, and a third region 814 associated with a third upper-level suboperation (collectively, the regions 810, 812, and 814). The operation completion display area 800 may provide labels 804, 806, 808, associated with the regions 810, 812, and 814 and their respective associated upper-level suboperations. For example, in FIG. 8, the first region 810 and its associated upper-level suboperation is labelled "Profile," the region 812 and its associated upper-level suboperation is labelled "Recommend," and the region 814 and its associated upper-level suboperation is labelled "Purchase."

Turning back to FIG. 5, at step 506, similar to the step 406, the processor detects activation of a first upper-level suboperation. For example, the first upper-level suboperation 1010 may be detected to be in the active state.

Turning again to FIG. 8, the operation completion display area 800 may provide a first color and a second color for the labels 804, 806, and 808 to indicate whether their respective associated upper-level suboperation is in the active state. For example, in FIG. 8, the labels 806 and 808 are provided with a first color whereas the label 804 is provided with a second color, thereby indicating that the upper-level suboperation associated with the first region 810 and the label 804 is in the active state.

Returning to FIG. 5, following the step 506, flow control proceeds to a step 508.

At the step 508, the associated region of the active first upper-level suboperation is divided. In particular, the associated region is divided into a first area 820 representing completed parts of the active first upper-level suboperation and a second area 822 representing incomplete parts of the active first upper-level suboperation. In some embodiments, flow control may proceed to step 508 in response to detecting activation of the first upper-level suboperation in the step 506. In some embodiments, the described division of the associated region may be used to indicate that the first upper-level suboperation is in the active state.

For example, in FIG. 8, the first region 810 is divided into a first area 820 and a second area 822. The first area 820 may represent the completed parts of the first upper-level suboperation associated with the first region 810. The second area 822 may represent the uncompleted parts of the first upper-level suboperation associated with the first region 810. Color may be utilized to distinguish the first area and the second area. For example, the second area 822 is of a first color whereas the first area 820 is of a second color.

Returning to FIG. 5, following the step 508, flow control proceeds to a step 510.

At the step 510, similar to the step 412 of FIG. 4, the processor detects completion of the first upper-level suboperation and activation of a second upper-level suboperation. In some embodiments, a user clicking a "next" or a "submit" button may cause the completion of the first upper-level suboperation and the activation of the second upper-level suboperation.

Following the step 510, flow control proceeds to the step 512.

At the step 512, the associated region of the active second upper-level suboperation is divided. In particular, the associated region is divided into a first area representing completed parts of the active second upper-level suboperation and a second area representing incomplete parts of the active second upper-level suboperation. In some embodiments, flow control may proceed to the step 512 in response to detecting activation of the second upper-level suboperation in the step 510. In some embodiments, the described division of the associated region may be used to indicate that the second upper-level suboperation is in the active state.

At the step 512, the first region may be solely comprised by the first second area, thereby indicating that the first upper-level suboperation is complete. Additionally or alternatively, color of the first region may be used to indicate that the first upper-level suboperation is complete.

Similar steps to the steps 510 and 512 may be repeated according to the number of upper-level suboperations of the operation for which progress is being conveyed by the operation completion indicator.

For example, in FIG. 8, the three regions 810, 812, and 814 indicate that there are three upper-level suboperations. For an operation comprising three upper-level suboperations, after executing the step 512, a similar step to 510 may be executed and a similar step to 512 where the third region 814 is divided may be executed thereafter.

Figure 6:
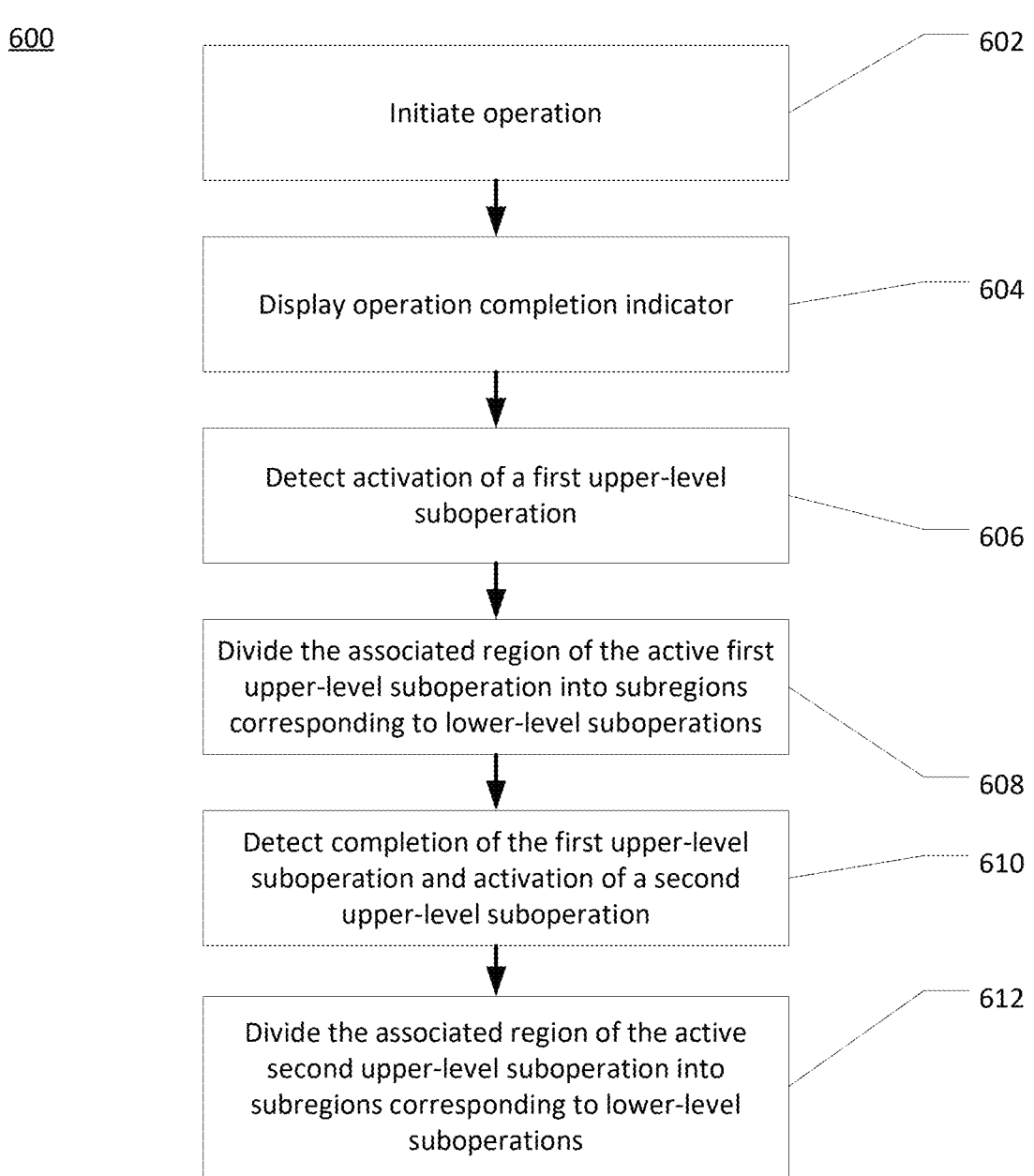
FIG. 6 depicts, in flowchart form, example steps performed by another embodiment of an application providing a user interface displaying an operation completion indicator.

Reference is made to FIG. 6, which depicts, in flowchart form, example steps performed by another embodiment of an application providing a user interface displaying an operation completion indicator. The example steps may be referred to as method 600. FIG. 6 illustrates a method 600 that includes steps 602 and onward. A computer-readable medium may store instructions for performing the method 600. Steps 602 and onward may be performed by one or more processors of a computing device, such as for example the processor 200 of the electronic device 100, executing software such as, for example, a suitable instance of the application 310. The software may include instructions which cause the method 600 to be performed.

At a step 602, the processor initiates an operation. In some embodiments, the operation may comprise receiving data input from a user. The step 602 is similar to the step 402 in FIG. 4. The operation initiated at the step 602 may be the operation 1000 in FIG. 10.

At a step 604, similar to the step 404 in FIG. 4, the processor causes to be displayed an operation completion indicator for the operation initiated at the step 602, for example the operation 1000.

Referring briefly to FIGS. 9A and 9B, another example application state is illustrated for an application providing a user interface displaying an operation completion indicator. The operation completion display area 900 and an operation completion indicator 902 of FIGS. 9A and 9B may be displayed at the step 604. The operation completion indicator 902 includes a first region 910, associated with a first upper-level suboperation, a second region 912 associated with a second upper-level suboperation, and a third region 914 associated with a third upper-level suboperation (collectively, the regions 910, 912, and 914).

Returning to FIG. 6, following the step 604, flow control proceeds to a step 606.

Figure 11:
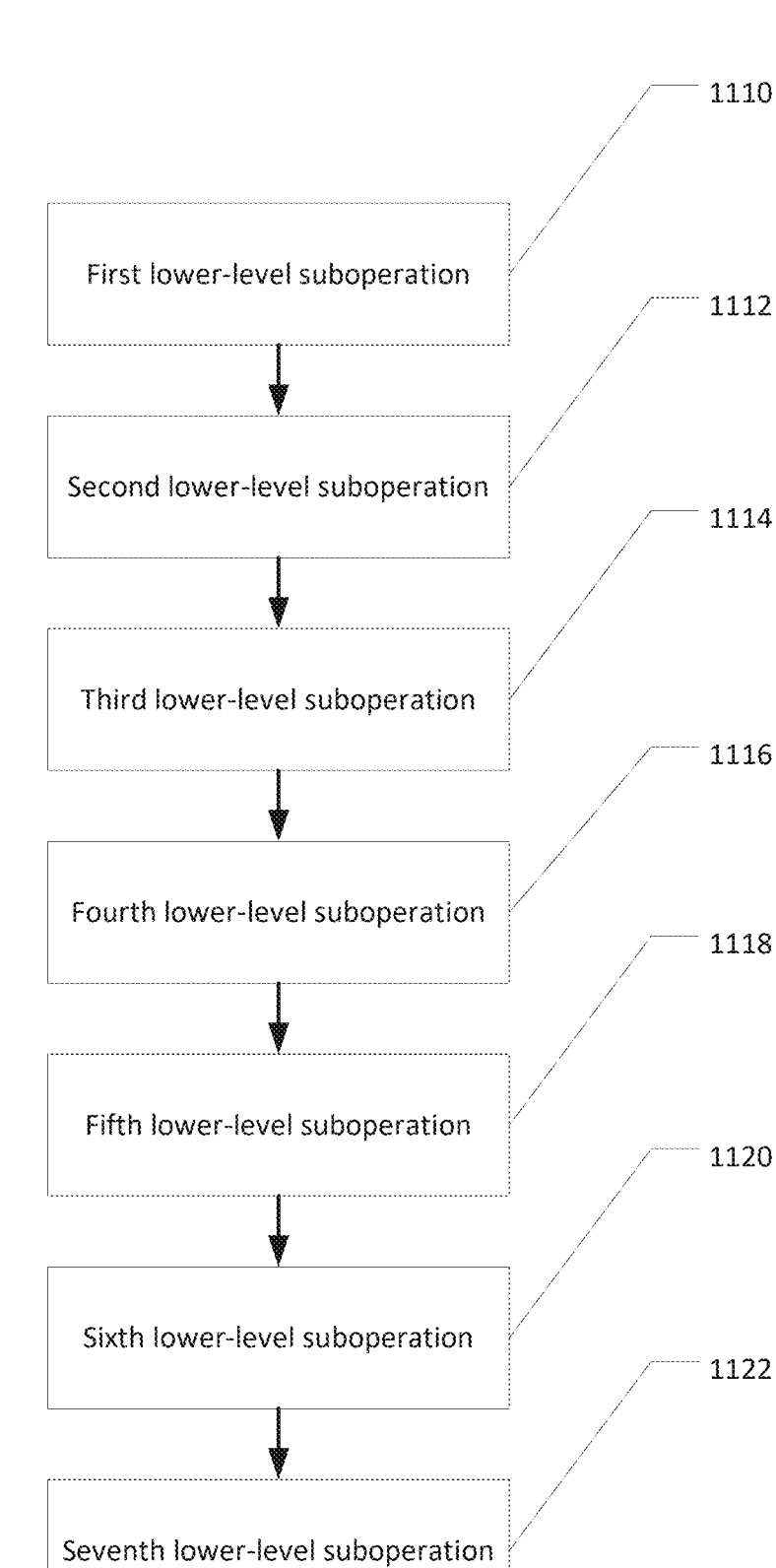
FIG. 11 illustrates an example upper-level suboperation of an operation for which progress is indicated by an operation completion indicator.

At the step 606, the processor detects activation of a first upper-level suboperation. For example, the first upper-level suboperation 1010 may be detected to be in the active state. The first upper-level suboperation 1010 may be as illustrated in FIG. 11. The first upper-level suboperation may entail the sequential execution of lower-level suboperations, specifically, a first lower-level suboperation 1110, a second lower-level suboperation 1112, a third lower-level suboperation 1114, a fourth lower-level suboperation 1116, a fifth lower-level suboperation 1118, a sixth lower-level suboperation 1120, and a seventh lower-level suboperation 1122 (collectively, the lower-level suboperations 1110, 1112, 1114, 1116, 1118, 1120, and 1122).

In some embodiments, a lower-level suboperation may require user input to be completed. For example, the lower-level suboperations 1110, 1112, 1114, 1116, 1118, 1120, 1122 may correspond to suboperations pertaining to the creation of a user profile (e.g. entering name information, creating a user ID, creating a password, entering age and sex information, entering a street address, entering a phone number, and entering an email address).

In some embodiments, a user clicking a "next" or a "submit" button (or another triggering input) may cause the completion of a lower-level suboperation and the activation of a subsequent lower-level suboperation. For example, in a scenario where the first lower-level suboperation 1110 corresponds to entering name information for a user profile, the first lower-level suboperation may be completed upon the user clicking "next." Subsequently or simultaneously, the first lower-level suboperation 1110 may enter the idle state and the second lower-level suboperation 1112 may enter the active state.

Returning to FIG. 6, following the step 606, flow control proceeds to a step 608.

At the step 608, the associated region of the active first upper-level suboperation is divided into subregions corresponding to lower-level suboperations. This operation may include determining a number of lower-level suboperations. That is, the computing device performing the method 600 may identify how many lower-level suboperations are to be performed for the upper-level suboperation to be completed.

Each lower-level suboperation may, for example, be associated with a different field and/or interface element of a user interface and/or form.

For example, in FIG. 9A, the first region 910 is divided into a first subregion 920 associated with the first lower-level suboperation 1110, a second subregion 922 associated with the second lower-level suboperation 1112, a third subregion 924 associated with the third lower-level suboperation 1114, a fourth subregion 926 associated with the fourth lower-level suboperation 1116, a fifth subregion 928 associated with the fifth lower-level suboperation 1118, a sixth subregion 930 associated with the sixth lower-level suboperation 1120, and a seventh subregion 932 associated with the seventh lower-level suboperation 1122 (collectively, the subregions 920, 922, 924, 926, 928, 930, and 932).

The described division of a region may be used to indicate that the associated upper-level suboperation is in the active state. For example, in FIG. 9A, the division of the first region 910 indicates that its associated upper-level suboperation, the first upper-level suboperation 1010, is in the active state. Likewise, in FIG. 9B, the first region 910 is undivided, thereby indicating that the first upper-level suboperation 1010 is in the idle state. Additionally or alternatively, in FIG. 9B, the division of the second region 912 indicates that its associated upper-level suboperation, the second upper-level suboperation 1012 is in the active state. Likewise, in FIG. 9A, the second region 912 is undivided, thereby indicating that the second upper-level suboperation 1012 is in the active state.

In some embodiments, similar to the upper-level suboperations, each of the lower-level suboperations may be in one of an active state or an idle state.

In some embodiments, an arrangement of colors of the subregions may be used to indicate which lower-level suboperations are complete or active. For example, in FIG. 9A, the subregions 928, 930, and 932 are of a first color whereas the subregions 920, 922, 924 and 926 are of a second color. This arrangement may be interpreted to mean that the first three lower-level suboperations that are associated with the subregions 920, 922, and 924 are completed and in the idle state, the fourth lower-level suboperation 1116 that is associated with the subregion 926 is in the active state, and the fifth, sixth, and seventh lower-level suboperations associated with the subregions 928, 930, and 932 are in the idle state and are yet to enter the active state.

Accordingly, in at least some implementations, a system, such as a computing device may display an operation completion indicator indicating progress of the operation. The operation completion indicator may be as described herein. For example, the operation completion indicator may include containing a plurality of regions. The regions may be visually distinct areas. Each region may be associated with a respective one of a plurality of upper-level suboperations of the operation. That is, each region may represent progress towards completion of the associated upper-level suboperations.

The computing device may determine a number of lower-level suboperations associated with one or more of the plurality of upper-level suboperations. For example, the computing device may determine a number of lower-level suboperations associated with a first one of the plurality of upper-level suboperations. The computing device may, in some cases, make this determination when the first one of the plurality of upper-level suboperations is the active one of the upper-level suboperations. Or, it may make the determination when the first one of the plurality of upper-level suboperations is expected to be the next active one of the upper-level suboperations.

The computing device may determine the number of lower-level suboperations for each upper-level suboperation, in at least some implementations.

The computing device may determine the number of lower-level suboperations for a given upper-level suboperation based on the number of lower-level suboperations that are to be completed for the given upper-level suboperation to be completed. The lower-level operations may represent inputs, in at least some implementations. For example, the lower-level operations may represent input fields. In at least some such implementations, the computing device may determine the number of lower-level suboperations for a given upper-level suboperation based on the number of input fields requiring completion for completion of that given upper-level suboperation.

After determining the number of lower-level suboperations for the first one of the upper-level suboperations, the computing device may configure the region associated with the first one of the plurality of upper-level suboperations to display a plurality of sub-regions corresponding to the number of lower-level suboperations associated with the first one of the plurality of upper-level suboperations only when the first one of the plurality of upper-level suboperations is the active one of the plurality of upper-level suboperations. That is, the sub-regions are only displayed for the active upper-level suboperation-they are not displayed for idle upper-level suboperations.

Additionally or alternatively, similar methods to methods 400 or 500 from FIGS. 4 and 5 may be used on the subregions associated with the lower-level suboperations. That is, for example, akin to method 400, the size of a subregion may be used to indicate that the associated lower-level suboperation is in the active state. Additionally or alternatively, akin to method 500, a subregion may be separated into a first subarea corresponding to completed parts of the associated lower-level suboperation and a second subarea corresponding to uncompleted parts of the associated lower-level suboperation.

In some embodiments where a lower-level suboperation requires user input to proceed, the user may be required to input data on separate pages. In such a scenario, the operation completion indicator or operation completion display area may appear to remain in the same fixed location on the user interface. For example, a first lower-level suboperation of entering name information for a profile may be on a separate page from a second lower-level suboperation of creating a user ID for a profile. A user may enter name information, and then click a "next" or "submit" button to see a new page for creating a user ID. For both pages, the operation completion display area may remain in the same fixed location on the interface.

Returning to FIG. 6, following the step 608, flow control proceeds to a step 610.

At the step 610, similar to the step 412 of FIG. 4, the processor detects completion of the first upper-level suboperation and activation of a second upper-level suboperation. In some embodiments, a user clicking a "next" or a "submit" button may cause the completion of the first upper-level suboperation and the activation of the second upper-level suboperation.

Following the step 610, flow control proceeds to a step 612.

At the step 612, the associated region of the active second upper-level suboperation is divided into subregions corresponding to lower-level suboperations of the second upper-level suboperation.

For example, in FIG. 9B, the second region 912 is divided into subregions 940, 942, 944, 946, 948, 950, and 952, each subregion being associated with a lower-level suboperation of the second upper-level suboperation.

Similar steps to the steps 610 and 612 may be repeated according to the number of upper-level suboperations of the operation for which progress is being conveyed by the operation completion indicator.

For example, in FIGS. 9A and 9B, the three regions 910, 912, and 914 indicate that there are three upper-level suboperations. For an operation comprising three upper-level suboperations, after executing the step 612, a similar step to 610 may be executed and a similar step to 612 where the third region 914 is divided may be executed thereafter.

In the methods above, the operations include steps of displaying an operation completion indicator, monitoring for completion of suboperations associated with the operation completion indicator, and updating the operation completion indicator using techniques described herein.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A computer system for displaying progress of an operation, the computer system comprising:

a processor;

a display coupled to the processor;

a memory coupled to the processor, storing instructions that, when executed by the processor, cause the computer system to:

display an operation completion indicator indicating progress of the operation, the operation completion indicator containing a plurality of regions, each region associated with a respective one of a plurality of upper-level suboperations of the operation and having a respective size;

determine a number of lower-level suboperations associated with one of the plurality of upper-level suboperations;

determine that the one of the plurality of upper-level suboperations is in an active state; and configure, in response to determining that the one of the plurality of upper-level suboperations is in the active state, the region associated with the one of the plurality of upper-level suboperations to be divided into a plurality of subregions, each of the plurality of subregions corresponding to a respective one of the number of lower-level suboperations associated with the one of the plurality of upper-level suboperations, the respective size of the region associated with the one of the plurality of upper-level suboperations remaining unchanged after dividing the region.

2. The computer system of claim 1, wherein the plurality of upper-level suboperations comprises at most one upper-level suboperation in the active state.

3. The computer system of claim 1, wherein the plurality of upper-level suboperations are executed in an order and detecting completion of the one of the plurality of upper-level suboperations causes another one of the plurality of upper-level suboperations to enter the active state, the another one of the plurality of upper-level suboperations being the upper-level suboperation to be executed after the one of the plurality of upper-level suboperations.

4. The computer system of claim 1, wherein the one of the plurality of upper-level suboperations progresses in response to input received via an input device.

5. The computer system of claim 1, wherein the instructions further cause the processor to:

determine, that one of the lower-level suboperations associated with the one of the plurality of upper-level suboperations is in the active state and that another one of the lower-level suboperations associated with the one of the plurality of upper-level suboperations is not in the active state;

configure the subregion associated with the one of the lower-level suboperations to indicate that the one of the lower-level suboperations is in the active state; and configure the subregion associated with the another one of the lower-level suboperations to indicate that the another one of the lower-level suboperations is not in the active state.

6. The computer system of claim 5 wherein configuring the subregion associated with the one of the lower-level suboperations includes displaying the subregion associated with the one of the lower-level suboperations to be enlarged relative to the subregion associated with the another one of the lower-level suboperations.

7. The computer system of claim 5, wherein:

configuring the subregion associated with the one of the lower-level suboperations includes displaying the subregion associated with the one of the lower-level suboperations in a first color; and configuring the subregion associated with the another one of the lower-level suboperations includes displaying the subregion associated with the another one of the lower-level suboperations in a second color different from the first color.

8. The computer system of claim 5, wherein the instructions further cause the processor to:

detect completion of the one of the lower-level suboperations; and configure, in response to detecting the completion of the one of the lower-level suboperations:

the subregion associated with the one of the lower-level suboperations to indicate that the one of the lower-level suboperations is not in the active state; and the subregion associated with the another one of the lower-level suboperations to indicate that the another one of the lower-level suboperations is in the active state.

9. The computer system of claim 8, wherein the instructions further cause the processor to configure, in response to detecting the completion of the one of the lower-level suboperations, the subregion associated with the one of the lower-level suboperations to indicate that the one of the lower-level suboperations is completed.

10. The computer system of claim 1, wherein the instructions further cause the processor to, subsequent to configuring the region associated with the one of the plurality of upper-level suboperations to display the plurality of subregions:

detect completion of the one of the plurality of upper-level suboperations; and display, in response to detecting the completion of the one of the plurality of upper-level suboperations, the region associated with the one of the plurality of upper-level suboperations as an undivided area.

11. The computer system of claim 1, wherein at least one of the number of lower-level suboperations progresses in response to input received via an input device.

12. The computer system of claim 1, wherein the operation completion indicator remains displayed in a fixed location on the display throughout the progress of the operation.

13. A computer-implemented method, the method comprising:

displaying an operation completion indicator indicating progress of an operation, the operation completion indicator containing a plurality of regions, each region associated with a respective one of a plurality of upper-level suboperations of the operation and having a respective size;

determining a number of lower-level suboperations associated with one of the plurality of upper-level suboperations;

determining that the one of the plurality of upper-level suboperations is in an active state; and configuring, in response to determining that the one of the plurality of upper-level suboperations is in the active state, the region associated with the one of the plurality of upper-level suboperations to be divided into a plurality of subregions, each of the plurality of subregions corresponding to a respective one of the number of lower-level suboperations associated with the one of the plurality of upper-level suboperations, the respective size of the region associated with the one of the plurality of upper-level suboperations remaining unchanged after dividing the region.

14. The computer-implemented method of claim 13, wherein the method further comprises:

determining, that one of the lower-level suboperations associated with the one of the plurality of upper-level suboperations is in the active state and that another one of the lower-level suboperations associated with the one of the plurality of upper-level suboperations is not in the active state;

configuring the subregion associated with the one of the lower-level suboperations to indicate that the one of the lower-level suboperations is in the active state; and configuring the subregion associated with the another one of the lower-level suboperations to indicate that the another one of the lower-level suboperations is not in the active state.

15. The computer-implemented method of claim 14 wherein configuring the subregion associated with the one of the lower-level suboperations includes displaying the subregion associated with the one of the lower-level suboperations to be enlarged relative to the subregion associated with the another one of the lower-level suboperations.

16. The computer-implemented method of claim 14, wherein:

configuring the subregion associated with the one of the lower-level suboperations includes displaying the subregion associated with the one of the lower-level suboperations in a first color; and configuring the subregion associated with the another one of the lower-level suboperations includes displaying the subregion associated with the another one of the lower-level suboperations in a second color different from the first color.

17. The computer-implemented method of claim 14, wherein the method further comprises:

detecting completion of the one of the lower-level suboperations; and, in response thereto configuring:

the subregion associated with the one of the lower-level suboperations to indicate that the one of the lower-level suboperations is not in the active state; and the subregion associated with the another one of the lower-level suboperations to indicate that the another one of the lower-level suboperations is in the active state.

18. The computer-implemented method of claim 17, wherein the method further comprises configuring, in response to detecting the completion of the one of the lower-level suboperations, the subregion associated with the one of the lower-level suboperations to indicate that the one of the lower-level suboperations is completed.

19. The computer-implemented method of claim 13, wherein the method further comprises, subsequent to configuring the region associated with the one of the plurality of upper-level suboperations to display the plurality of subregions:

detecting completion of the one of the plurality of upper-level suboperations; and displaying, in response to detecting the completion of the one of the plurality of upper-level suboperations, the region associated with the one of the plurality of upper-level suboperations as an undivided area.

20. A non-transitory computer readable medium storing processor-executable instructions that, when executed by a processor, cause the processor to:

display an operation completion indicator indicating progress of an operation, the operation completion indicator containing a plurality of regions, each region associated with a respective one of a plurality of upper-level suboperations of the operation and having a respective size;

determine a number of lower-level suboperations associated with one of the plurality of upper-level suboperations;

determine that the one of the plurality of upper-level suboperations is in an active state; and configure, in response to determining that the one of the plurality of upper-level suboperations is in the active state, the region associated with the one of the plurality of upper-level suboperations to be divided into a plurality of subregions, each of the plurality of subregions corresponding to a respective one of the number of lower-level suboperations associated with the one of the plurality of upper-level suboperations, the respective size of the region associated with the one of the plurality of upper-level suboperations remaining unchanged after dividing the region.

* * * * *